United States Patent [19]

Röder et al.

[11] Patent Number: 5,067,599
[45] Date of Patent: Nov. 26, 1991

[54] ARRANGEMENT FOR CONTROLLING A MOTOR FRICTION CLUTCH

[75] Inventors: Manfred Röder; Andreas Konrad, both of Untereuerheim, Fed. Rep. of Germany

[73] Assignee: Fichtel & Sachs AG, Schweinfurt, Fed. Rep. of Germany

[21] Appl. No.: 547,620

[22] Filed: Jul. 2, 1990

[30] Foreign Application Priority Data

Jul. 7, 1989 [DE] Fed. Rep. of Germany ....... 3922315

[51] Int. Cl.$^5$ .............................................. B60K 41/02
[52] U.S. Cl. ............................... 192/0.32; 192/0.075; 192/0.096
[58] Field of Search ............... 192/0.032, 0.075, 0.076, 192/0.096

[56] References Cited

U.S. PATENT DOCUMENTS

| 4,331,226 | 5/1982 | Heidemeyer et al. | 192/0.076 |
| 4,509,625 | 4/1985 | Tellert | 192/0.076 X |
| 4,618,043 | 10/1986 | Hattori et al. | 192/0.076 X |
| 4,632,231 | 12/1986 | Hattori et al. | 192/0.076 |
| 4,653,621 | 3/1987 | Oshiage | 192/0.032 |
| 4,662,494 | 5/1987 | Wakiya et al. | 192/0.076 X |

FOREIGN PATENT DOCUMENTS

| 0130794 | 11/1985 | European Pat. Off. |
| 3028250 | 4/1982 | Fed. Rep. of Germany . |
| 3334723 | 4/1985 | Fed. Rep. of Germany . |
| 3334724 | 4/1985 | Fed. Rep. of Germany . |
| 2634697 | 2/1990 | France . |
| 2221969 | 2/1990 | United Kingdom . |

Primary Examiner—Richard Lorence
Attorney, Agent, or Firm—Toren, McGeady & Associates

[57] ABSTRACT

For controlling a motor vehicle friction clutch (3) which is operated by an actuating drive (7) during parking maneuvers, an output adjusting device (19) of the internal combustion engine (1) is unaffected over a limited initial pedal travel ($a_0$) of the accelerator pedal (17). According to the pedal position at any given time, the actuating drive (7) of the clutch (3) is controlled within the initial pedal travel. According to the pedal position and in keeping with a predetermined first signal characteristic a desired torque signal is generated and the actuating drive (7) is positioned as a function of the desired torque signal and in keeping with a predetermined second signal characteristic. In the clutch position determined by the pedal position, an actual torque signal is generated which represents the torque of the internal combustion engine (1) and it is compared with the desired torque signal. If the torque signals deviate from each other, a predetermined and appropriately directed correction factor is added and the actuating drive (7) is subsequently controlled as a function of the altered second signal characteristic.

9 Claims, 2 Drawing Sheets

ARRANGEMENT FOR CONTROLLING A MOTOR FRICTION CLUTCH

BACKGROUND OF THE INVENTION

The invention relates to an arrangement for controlling a motor vehicle friction clutch which is operated by an actuating drive.

Proposed in the not pre-published German Patent Application P 38 23 387 applied for on July 7, 1988 is an arrangement which facilitates parking of a motor vehicle equipped with an automated friction clutch. In normal running, the automated friction clutch is automatically engaged and/or disengaged when starting up and changing gear, as the case may be. During manoeuvring, for example when parking, however, the friction clutch should only be partially closed so that the vehicle moves at a creep speed with a slipping clutch. According to the earlier patent application, this is achieved in that the accelerator pedal which controls an output adjusting means on the internal combustion engine of the motor vehicle, for example its throttle valve or injection pump, does not influence the load adjusting means during a limited initial travel of the pedal which follows on from the inoperative position of the accelerator pedal. A pedal position sensor ascertains the position of the accelerator pedal at any given moment, at least within this initial pedal travel and generates a pedal position signal which adjusts the actuating drive of the friction clutch via a control so that it assumes a clutch position between the completely disengaged position and the completely engaged position of the friction clutch. The clutch position and thus the torque transmitted by the friction clutch can thus be controlled by the accelerator pedal within its initial travel.

Between the pedal position on the one hand and the torque transmitted by the friction clutch on the other, there should be a predetermined for example directly proportional relationship which ought not to alter during the period of use of the motor vehicle but which is dependent upon a number of influencing variables, particularly the condition of the friction clutch, such as for example its temperature or its state of wear and tear.

SUMMARY OF THE INVENTION

It is an object of the invention to provide an automated friction clutch that can be adjusted to a torque which is to be transmitted and which is determined by the position of an accelerator pedal of the motor vehicle. It is intended easily to ensure that influencing variables which affect the predetermined relationship between pedal position and the clutch torque which is to be transmitted are automatically compensated.

Within the scope of the invention, the premise adopted is once again a motor vehicle friction clutch which is operated by an actuating drive and which is in conventional manner engaged and disengaged automatically for example when driving away or when changing the gears in a gear shift mechanism, such as is explained for example in German Offenlegungsschrift No. 30 28 250. In order, for instance for parking manoeuvres, to be able to adjust the friction clutch so that it assumes a clutch position which transmits a partial torque and which is between the disengaged position and the engaged position, as a function of the position of the accelerator pedal at that particular time, the internal combustion engine of the motor vehicle has an output adjusting device which cannot be influenced by the accelerator pedal over a limited initial travel of the pedal following on from the inoperative position of the accelerator pedal. During this initial travel, the accelerator pedal is not used for controlling the output adjusting device of the internal combustion engine, i.e. for controlling its throttle valve or injection pump, but for controlling the position of the friction clutch. In order to achieve a predetermined relationship between the pedal position at any given moment and the torque transmitted by the friction clutch and which is unaffected by operating parameters of the friction clutch, such as for example its state of wear and tear or its temperature, a desired torque signal corresponding to a predetermined first signal characteristic is generated as a function of a pedal position signal which represents the pedal position at a given moment. The actuating drive of the friction clutch is then controlled by a clutch position signal which is generated as a function of the desired torque signal in accordance with a predetermined and second signal characteristic. Both signal characteristics ensure that there is a predetermined for example linear relationship between the setting of the accelerator pedal at any given time within the initial travel of the pedal and the torque transmitted by the clutch and resulting therefrom. Variations in the torque-transmission behaviour of the friction clutch are generated by comparison of the desired torque signal with an actual torque signal which is actually applied by the internal combustion engine in the position of the friction clutch which is established by the clutch position signal. The deviation of the actual torque signal from the desired torque signal is a measure of the positioning error of the actuating drive. A correctly directed addition or superimposition of at least one correcting factor on the torque-dependent pattern of the clutch position signal which is established by the second signal characteristic compensates for the deviation so that subsequently the desired relationship between pedal position and the torque delivered by the clutch is respected. The correcting factor may be a relatively small value so that possibly in the case of a relatively pronounced deviation also a multiple superimposition of the correcting factor may be necessary before the actual torque signal corresponds to the desired torque signal.

In order to achieve the steadiest possible variation in the second signal characteristic, it is expedient not to superimpose a correction factor which is constant over the entire torque range but a correction signal characteristic. The correction values or the correction signal characteristic are expediently selected as a function of the magnitude of the torque represented by the desired torque signal or the actual torque signal. Particularly when correcting the second signal characteristic by a correction signal characteristic, the torque-dependent pattern of the correction signal characteristic can be optimised by selection from a range of characteristic curves. Expediently, one correction signal characteristic is selected the maximum correction factor of which lies in the range of the torque at which the comparison of actual signal with desired signal is carried out. At other torque levels, the pattern of the correction values determined by the correction signal characteristic diminishes, preferably so that the correction values are nil at the limits of the torque values to be transmitted by the clutch and which are adjustable in the initial pedal travel. In this way, a smooth transition from accelerator-dependent control of the clutch to the automated clutch positioning mode is achieved during starting-up of the motor vehicle.

The torque applied by the internal combustion engine at any given moment can be measured directly by suitable torque sensors for generating the actual torque signal. However, since direct measurement is structurally involved, the actual torque signal is in a preferred embodiment of the invention ascertained indirectly by establishing the setting of the output positioning means of the internal combustion engine at any given moment. In this embodiment, the output adjusting means comprises a speed regulating device which maintains the speed of the internal combustion engine at a constant level when the accelerator pedal is within the initial pedal travel. The position for instance of a control rod of the load adjusting means which may adjust the throttle valve or the injection system of the internal combustion engine is a measure of the torque being generated at any given moment by the internal combustion engine. The actual torque signal is generated as a function of a predetermined third signal characteristic as a function of the setting of the output adjusting means, i.e. for example as a function of the position of the control rod.

The third signal characteristic which represents the relationship between the torque delivered by the internal combustion engine and the setting of the output adjusting means is in most cases dependent upon parameters relating to the condition of the internal combustion engine, for example its cooling water temperature. In order to permit of correct clutch operation even during the warming-up phase of the engine, a preferred embodiment provides that whenever the accelerator pedal is in the inoperative position, a test is made to ascertain whether the third signal characteristic which is used to generate the actual torque signal does in the inoperative position of the accelerator pedal represent an output setting which is in accordance with the output setting of the output setting device at any particular time. For the subsequent operation of the clutch, from the whole range of available third characteristics, always the particular third signal characteristic is selected which corresponds to the setting of the output setting device in the inoperative position of the pedal at any given moment.

The second signal characteristic like the groups of characteristic curves of the third signal characteristic and the correction signal characteristics are expediently stored for instance in tabular form in memory devices. In the case of the memory device for the second signal characteristic, this is a memory which can be over-written, preferably a memory which is capable of storing the second signal characteristic at any given time even beyond the shut-down of the internal combustion engine. In this way, the second signal characteristic does not have to be corrected afresh every time the engine is put into operation. The clutch is operated with whichever was the last configuration of the second signal characteristic.

Expediently, the second signal characteristic is after every change checked to establish whether it is still within predetermined signal limit characteristics which define an acceptable range of operation of the clutch. If the acceptable operating range is exceeded, a for example visual or acoustic warning signal is given.

The various features of novelty which characterize the invention are pointed out with particularity in the claims annexed to, and forming part of, this disclosure.

For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
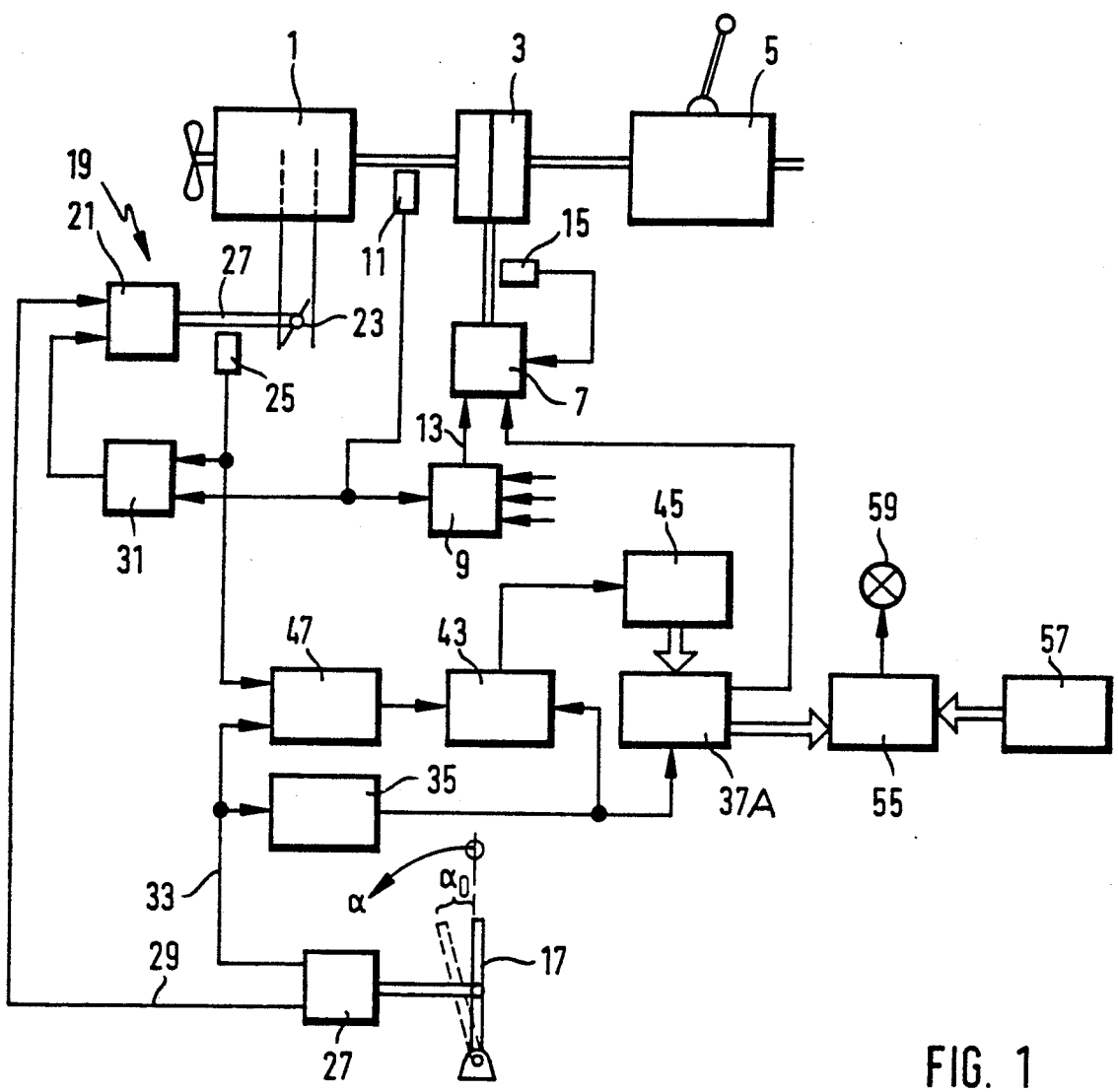
FIG. 1 is a circuit diagram of an arrangement for controlling a friction clutch of a motor vehicle.

FIG. 1 diagrammatically shows an internal combustion engine 1 of a motor vehicle which can be coupled by a friction clutch 3 to a for example manually selectable shift gear mechanism 5. The clutch 3 can be controlled via an actuating drive 7 between a completely engaged clutch position EK and a completely disengaged clutch position AK by means of a clutch control arrangement 9 as a function of the operating condition of the motor vehicle. In the example of embodiment illustrated, the clutch control 9 will, when the motor vehicle is being started up, respond to a sensor 11 which ascertains the rotary speed of the internal combustion engine 1 and generates at its output 13 a clutch positioning signal which is proportional to the rotary speed of the internal combustion engine 1 at any given moment. The clutch position signal adjusts the clutch 3 to a position which is established by the rotary speed of the internal combustion engine 1. For this purpose, the actuating drive 7 is constructed as a positioning drive and comprises a position sensor 15 which ascertains the actual position of the clutch, for example the actual setting of the clutch disengaging device. Upon manual shifting of the gear mechanism 5, it is in the example of embodiment illustrated envisaged that the clutch 3 should be engaged at a predetermined speed as a function of the gear which is to be shifted. The clutch 3 is disengaged when the engine speed 11 falls below a predetermined level.

The clutch control arrangement 9 controls the clutch 3 during starting up and during normal running of the motor vehicle. The engine speed dependent positioning of the clutch 3 during start-up does indeed also make it possible to manoeuvre the motor vehicle at a low speed but it is necessary to become accustomed to this mode of operation since the engine speed determines the torque transmitted by the clutch. In order to liken the clutch behaviour to the mode of operation of motor vehicles with an automatic clutch and a torque converter, it is envisaged that the accelerator pedal shown in its inoperative position at 17 should, in an initial pedal travel $\alpha_0$ which follows on immediately from the inoperative position should be decoupled from an output positioning device 19 so that it cannot affect this latter and that within the initial pedal travel $\alpha_0$ a clutch position signal is generated which is dependent upon the pedal position $\alpha$ and which positions the actuating drive 7 of the clutch 3 instead of the clutch control arrangement 9 which is provided for starting-up and running conditions. Within the initial pedal travel $\alpha_o$, therefore, the position of the accelerator pedal 17 determines the position of the clutch 3. The clutch 3 is adjusted to a torque transmitting position between the engagement position EK and the disengagement position AK.

The output adjusting device 19 of the internal combustion engine 1 comprises an actuating drive 21 which drives an output adjusting member 23 of the internal combustion engine, for example its throttle valve or the means of adjusting the injection volumes. A positioning sensor 25 ascertains the setting of the adjusting member 23 at any given moment, for example via the control rod 27 which couples the actuating drive 21 to the positioning member 23. At pedal positions $\alpha > \alpha_o$, a position sensor 25 which ascertains the position of the accelerator pedal 17 at any given moment controls the actuating drive 21 directly via its output 29. In the inoperative position of the accelerator pedal 17 and in pedal positions within the initial pedal travel $\alpha_o$, the position transmitter 27 is disengaged from the actuating drive 21 and the actuating drive 21 is maintained by a rotary speed regulator 31 connected to the rotary speed sensor 11 at a constant level of rotary speed, for example the idling speed of the internal combustion engine 1. The arrangement may be so contrived that the rotary speed governor 31 adjusts the idling speed only in the inoperative position of the pedal 17 but inputs a somewhat higher but likewise constant speed within the initial pedal travel.

Figure 2:
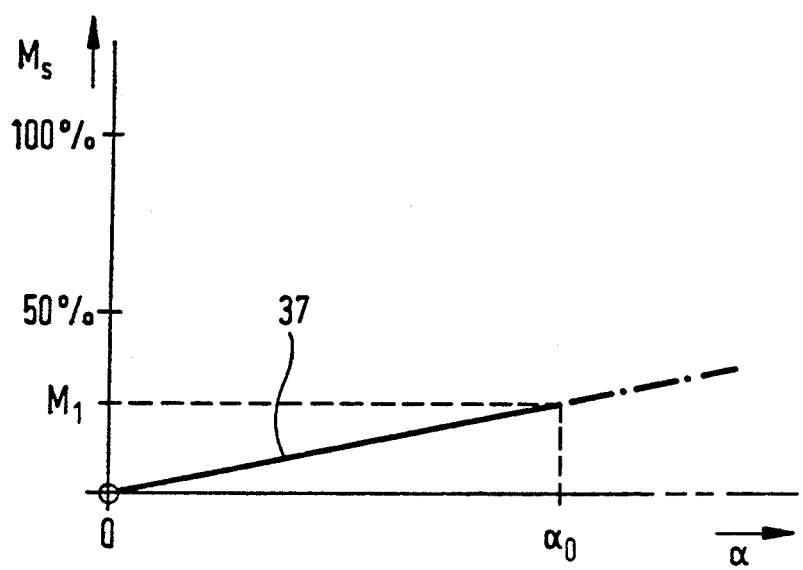
FIG. 2 is a diagram with a first signal characteristic, showing a desired torque signal $M_s$ which is to be transmitted by the clutch, as a function of the pedal position $a$ of an accelerator pedal of the motor vehicle.
Figure 3:
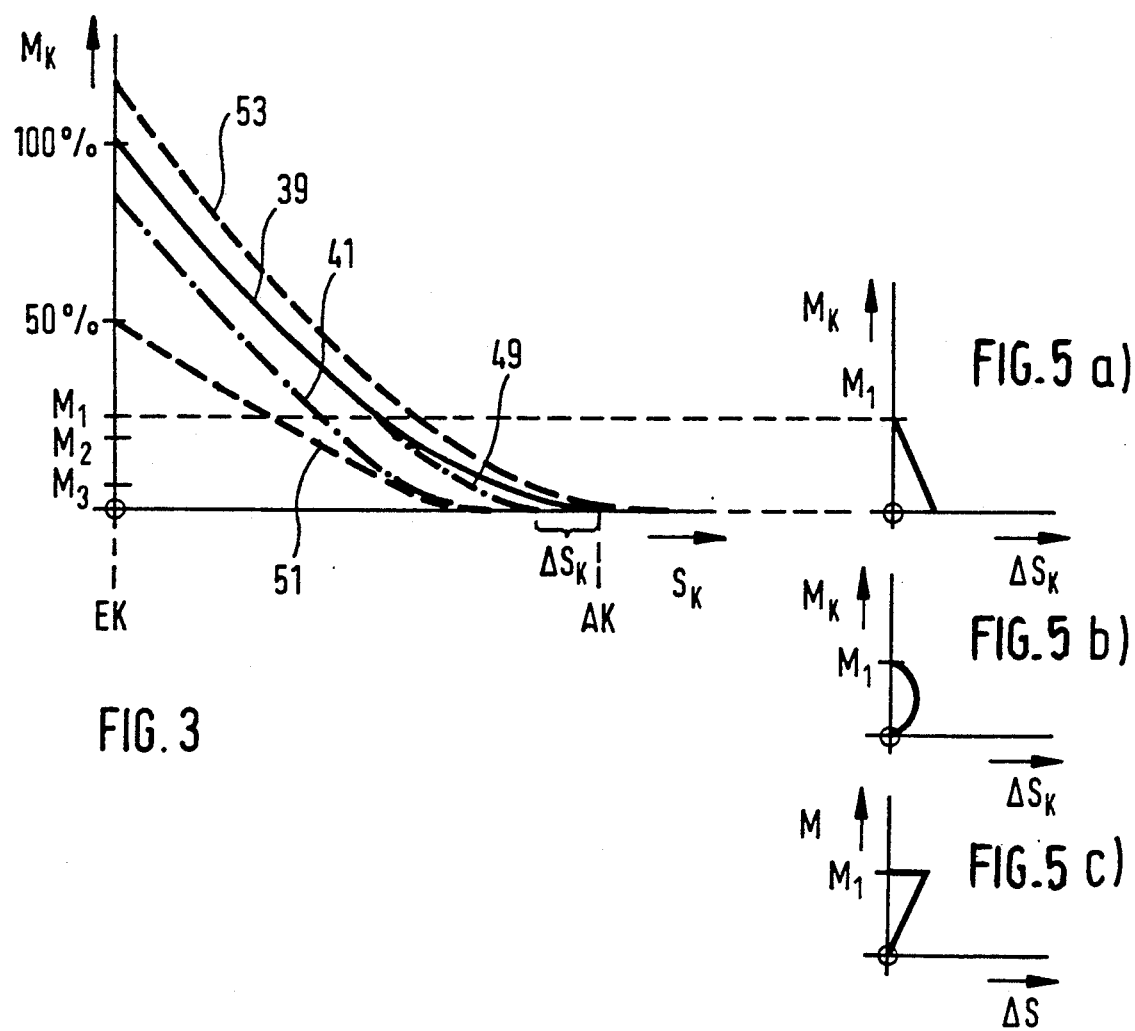
FIG. 3 is a diagram with a second signal characteristic which shows the torque $M_k$ transmitted by the clutch as a function of the position $S_k$ of a clutch actuating drive.

The pedal position sensor 27 generates within the initial pedal travel $\alpha_o$ at its output 33 a pedal position signal which represents the position of the accelerator pedal 17 at any given moment. The pedal position signal is fed to a first table memory 35 which stores values of a desired torque signal $M_s$ for the torque to be transmitted by the clutch 3 as a function of the pedal position signal $\alpha$ in the form of a first signal characteristic 37 (FIG. 2). The signal characteristic 37 which, in the example of embodiment shown, is a straight line, allocates to the values of the pedal position signal within the initial pedal travel $\alpha_o$ values from a partial range $M_1$ of the torque to be transmitted. The desired torque signal $M_s$ is fed to a second table memory 37A which stores values of the clutch position signal $S_k$ of the actuating drive 7 of the clutch 3 as a function of the torque $M_k$ transmitted by the clutch 3 in this position, in the form of a second signal characteristic 39 (FIG. 3). As a function of the desired torque signal $M_s$ supplied from the first table memory 35, so the second table memory 37 supplies the clutch position signal $S_k$ which determines the position of the clutch 3 which is adjusted by the actuating drive 7.

The form of the signal characteristic 39 depends upon a number of influencing variables, for example the state of wear and tear of the clutch 3 and its operating condition at that given time, particularly its temperature. The signal characteristic 39 shown by a continuous line in FIG. 3 for instance represents the torque transmission characteristic of a new clutch which in the engagement position EK transmits 100% of the torque and transmits no torque in the disengaged position AK. With increasing wear, the torque transmitting behaviour of the clutch changes as is indicated by the dash-dotted signal characteristic 41 in FIG. 3. In the engaged condition, the clutch no longer attains the 100% which is possible with the new clutch and the disengaged position is reached in clutch positions $S_k$ which approximate the engaged position EK.

The arrangement according to FIG. 1 permits of a correction of the first signal characteristic from the second table memory 37 which is used for positioning the actuating drive 7. For this, a correction means 43 compares an actual torque signal generated hereinafter by a manner not described in greater detail with the desired torque signal $M_s$ generated in accordance with the position of the accelerator pedal within the initial pedal travel $\alpha_o$. The correction device 43 has associated with it a table memory 45 in which a number of correction signal characteristic curves are stored. In the event of a difference between the desired torque signal and the actual torque signal, then as a function of the magnitude of one of these two torque signals, in this case the desired torque signal $M_s$, so one of the correction signal characteristics is selected and additively superimposed on the signal characteristic of the table store 37 according to the sign preceding the desired signal/actual signal difference. The second table memory store 37A subsequently stores the amended signal characteristic for controlling the actuating drive 7 of the clutch 3.

The actual torque signal is generated by means of a table memory 47 which is connected to the position sensor 25 of the output adjusting means 19 and which stores a number of signal characteristic curves, storing in each case the engine torque $M_{m\ o}$ generated by the internal combustion engine 1 when it is running at the speed, for example idling speed, determined by the speed regulator 31, as a function of the output adjusting signal $S_m$ ascertained by the position sensor 25. The engine torque signal $M_{m\ o}$ is equal to the actual torque signal since in positions of the accelerator pedal within the initial pedal travel $\alpha_o$ the speed governor 31 maintains the engine speed constant.

Figure 4:
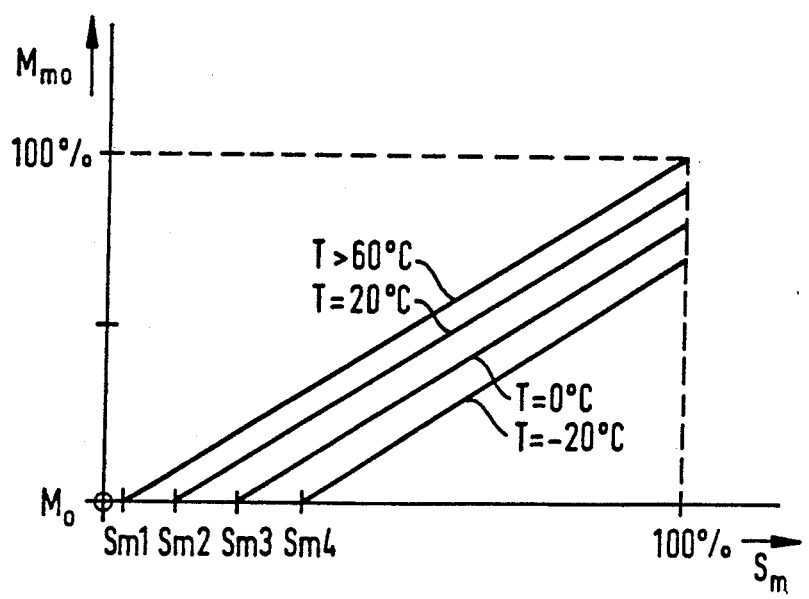
FIG. 4 is a diagram showing the torque $M_{m0}$ generated by the internal combustion engine at idling speed as a function of the adjusted position $S_m$ of a speed-governed output setting device of the internal combustion engine for several cooling water temperatures T and FIGS. 5a–c show correction signal characteristics for the clutch torque $M_k$ according to FIG. 3 as a function of a variation $\Delta S_k$ in the adjusted position of the output adjusting device.

The engine torque $M_{m\ o}$ is dependent upon the operating parameters of the internal combustion engine 1, being for example dependent upon the cooling water temperature T as is shown in FIG. 4 for the temperature values $-20°$ C., $0°$ C., $+20°$ C. and temperatures $>60°$ C. with reference to a plurality of signal characteristics. For comparison of the desired torque signal with the actual torque signal, it is necessary to choose that characteristic of the table memory 47 which in the inoperative position of the pedal 17, i.e. during idling of the engine 1, represents an output adjusting signal $S_m$ which coincides with the output adjusting generated by the position sensor 25. In the inoperative position of the accelerator pedal 17, if the position sensor 25 generates for example an output adjusting signal $sm_2$, then for subsequent comparison in the correction device 43, the characteristic curve $T=20°$ C. (FIG. 4) is chosen. The choice of characteristic curve is brought up to date whenever the accelerator pedal 17 returns to its position of rest.

Figure 5:
Figure 5:
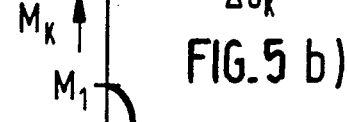
Figure 5:
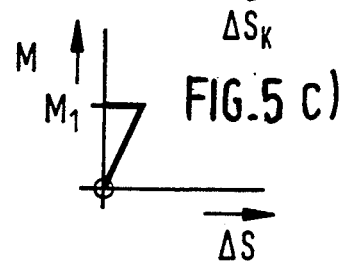

FIG. 5 shows correction signal characteristics for correcting the signal characteristic of the table memory 37 which represents the clutch position $S_k$ as a function of the clutch torque $M_k$ which is to be transmitted. The correction signal characteristics supply correction signals $\Delta S_k$ for the clutch position $S_k$ as a function of the clutch moment $M_k$ and in fact over the whole range of torque levels between 0 and M1 adjustable in accordance with the desired torque signal $M_s$. The curve of the correction signal characteristic depends upon the magnitude of the desired torque signal and thus the magnitude of the coupling moment $M_k$ which is to be transmitted. In the example illustrated, three ranges 0 to M3, M3 to M2 and M2 to M1 are envisaged and associated with each of them are different correction signal characteristics according to FIGS. 5a, b and c. Each of the correction signal characteristics supplies a maximum contribution to the correction signal variation $\Delta S_k$ in the torque range associated with it and for the rest it falls to nil at the limits of the total range 0 to M1 of the desired torque signal which can be adjusted by means of the table memory 35. The correction signal characteristic in FIG. 5a is correspondingly associated with the range 0 to M3 and reduces from a maximum of $\Delta S_k$ at 0 torque to the value 0 at M1 torque. The correction signal characteristic according to FIG. 5b is associated with the torque range M3 to M2 and has its maximum of $\Delta S_k$ between the limits M3 and M2 at which the curve 0 is located. Finally, the correction signal characteristic according to FIG. 5c is associated with the torque range M2 to M1 and diminishes from 0 at torque 0 to a maximum level of $\Delta S_k$ at torque M1. By a dash-dotted line 49, FIG. 3 shows the pattern of the altered signal characteristic curve 39 once a torque difference has occurred in the torque range extending from 0 to M3 and the signal characteristic 39 has been reduced by the pattern of the correction signal characteristic according to FIG. 5a. For subsequent clutch operation, control of the actuating drive 7 is dependent upon the signal characteristic curve 49 written into the second table memory 37A instead of the characteristic curve 39.

The maximum value of $\Delta S_k$ of each correction signal characteristic is comparatively small so that possibly a plurality of successive correction steps are required in order to be able to compensate for the deviation of the actual torque signal from the desired torque signal which is established by the correction device 43.

Expediently, the second table memory 37 is so configured that when the ignition of the internal combustion engine 1 is switched off, it is not erased but instead stores the signal characteristic 49 for later renewed operation of the engine.

The arrangement according to FIG. 1 makes it possible to monitor the operating status of the clutch 3. In FIG. 3, reference numeral 51 denotes a limit characteristic which is associated with a substantially completely worn clutch. 53 represents a further limit characteristic which corresponds to a new thermally heavily loaded clutch. The range between the limit characteristics 51, 53 represents the acceptable operating range of the clutch. The arrangement according to FIG. 1 comprises a monitoring device 55 which compares both the limit characteristics 51, 53 stored in a table memory 57 with the actual signal characteristic stored in the second table memory 37A. The monitoring arrangement 55 comprises visual or acoustic alarm means 59 to generate a warning signal when the signal characteristic of the second table memory 37 departs from the acceptable operating range between the two limit characteristics 51, 53.

While specific embodiments of the invention have been shown and described in detail to illustrate the application of the inventive principles, it will be understood that the invention may be embodied otherwise without departing from such principles.

What we claim is:

1. An arrangement for controlling a friction clutch (3) being operated by an actuating drive (7) and being part of a motor vehicle in which an internal combustion engine (1) comprises an output setting device (19) which can be controlled by means of an accelerator pedal (17) but which cannot be influenced by the pedal (17) in a limited initial pedal travel ($\alpha_o$) which follows on from an inoperative position of the pedal (17), and comprising a pedal position sensor (27) which generates a pedal position signal representing the actual position of the accelerator pedal (17) within the initial pedal travel ($\alpha_o$), and comprising a control arrangement (35, 37) which as a function of the pedal position signal generates a clutch position signal for controlling the actuating drive (7) which adjusts the actuating drive (7) to a clutch position transmitting torque and associated with the actual position of the accelerator pedal (17) the clutch position falling between a completely disengaged position and a completely engaged position of the friction clutch (3), wherein first control means (35) of the control arrangement which establishes a predetermined first signal characteristic generate a desired torque signal dependent upon the pedal position signal and the first signal characteristic and wherein second control means (37) of the control arrangement which establishes a predetermined second signal characteristic generate the clutch position signal which controls the actuating drive (7) as a function of the desired torque signal and the second signal characteristic, and wherein a correction means (43, 45, 47) in the position of the friction clutch which is established by the clutch position signal generates an actual torque signal representing the torque of the internal combustion engine (1) at any given moment, comparing it with the desired torque signal and wherein correction means (43, 45, 47) determines at least one correction value for correction of the torque-dependent pattern of the values of the clutch position signal which are established by the second signal characteristic of the second control part (37), and wherein if there is a deviation of the actual torque signal from the desired torque signal, the correction means (43, 45, 47) alters the second signal characteristic established by the second control means (37) by an appropriately directed addition of the correction value to the torque-dependent pattern of the clutch position of the second signal characteristic for subsequent controlling of the actuating drive (7).

2. An arrangement according to claim 1, wherein the correction means (43, 45, 47) establishes a correction signal characteristic which determines a pre-established torque-dependent pattern of correction values for the values of the clutch position signal established by the second signal characteristic of the second control means (37) and wherein the correction means (43, 45, 47) adds the torque-dependent pattern of the correction signal characteristic to the torque-dependent pattern of the clutch position signal.

3. An arrangement according to claim 2, wherein the correction means (43, 45, 47) establishes a number of correction signal characteristics which are in each case associated specifically with different partial value ranges of one of the two torque signals which are compared with each other during desired value/actual value comparison, and wherein the correction means (43, 45, 47) selects the correction signal characteristic intended for subsequent modification of the second signal characteristic as a function of the value of a torque signal occurring during comparison of the desired value with the actual value.

4. An arrangement according to claim 3, wherein over substantially the entire range of values of a torque signal adjustable in the initial pedal travel defines correction values for the clutch position signal established by the second signal characteristic in this range of values, the maximum of the correction values of each correction signal characteristic lying in the partial value range associated specifically with the correction signal characteristic, the correction values diminishing towards adjacent values of the torque signal.

5. An arrangement according to claim 4, wherein the correction values in the region of at least one of the two limits of the entire value range of one torque signal diminish to zero.

6. An arrangement according to claim 1, wherein output adjusting means (19) of the internal combustion engine (1) comprise an idling speed regulating device (31) which maintains the rotary speed of the internal combustion engine (1) at a constant and given value when the accelerator pedal (17) is in the initial pedal travel, and wherein the output adjusting means (19) comprises an output adjustment sensor (5) which generates an actual output setting signal which represents the setting of the output adjusting means (19) at any given moment and wherein correction means (43, 45, 47) establishes a predetermined third signal characteristic and generates the actual torque signal as a function of the actual output adjustment signal and the third signal characteristic.

7. An arrangement according to claim 6, wherein the output adjustment sensor (25), when the accelerator pedal (17) is in its inoperative position, generates an actual idling output adjustment signal which represents the idling setting (19) and wherein the correction means (43, 45, 47) for the subsequent generation of the actual torque signal selects the third signal characteristic which when setting the idling establishes an output setting signal the value of which is substantially identical to the actual idling output setting signal generated by the output setting sensor (25).

8. An arrangement according to claim 1, wherein a monitoring means (55, 57, 59) establishes at least one limit signal characteristic which defines an admissible operating range for variations of the second signal characteristic and wherein monitoring means (55, 57, 59) compares the second signal characteristic with the limit signal characteristic and generates a warning signal if the admissible operating range is exceeded.

9. An arrangement according to claim 1, wherein the second signal characteristic is stored in a memory (37) which stores the second signal characteristic also when the internal combustion engine (1) is shut down.

* * * * *